F. DE W. GOODWIN.
GEAR SHIFTING MECHANISM.
APPLICATION FILED DEC. 18, 1916.
1,286,997.
Patented Dec. 10, 1918.
3 SHEETS—SHEET 3.
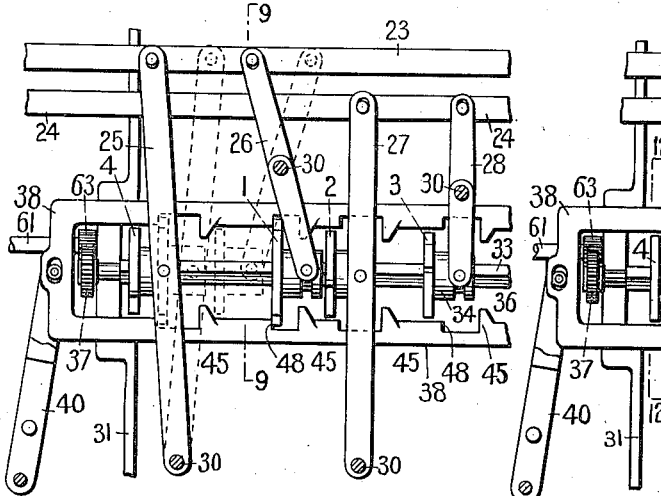
FIG. 7.
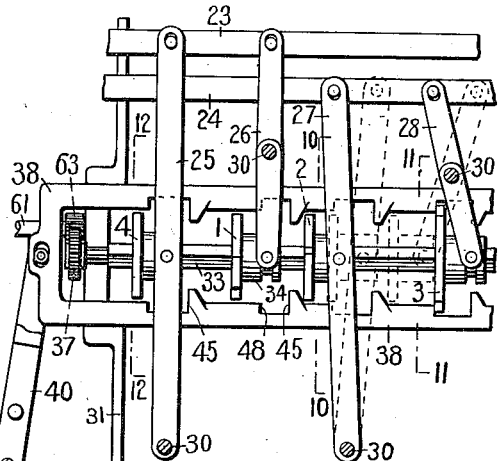
FIG. 8.
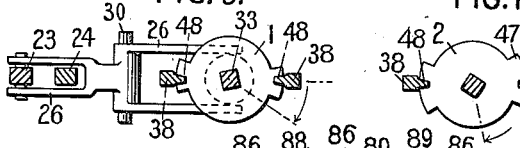
FIG. 9. FIG. 10. FIG. 11. FIG. 12.
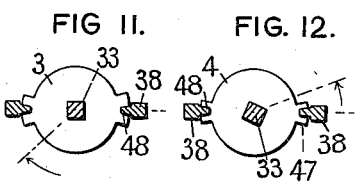
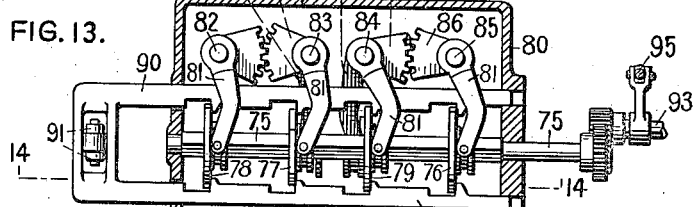
FIG. 13.
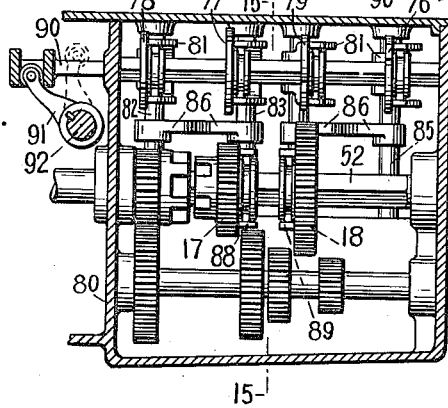
FIG. 14.
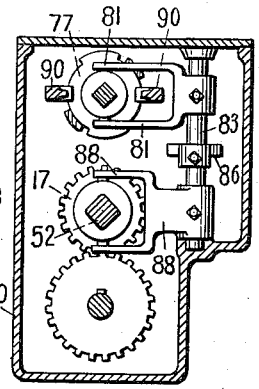
FIG. 15.
Inventor
Frederick DeWitt Goodwin

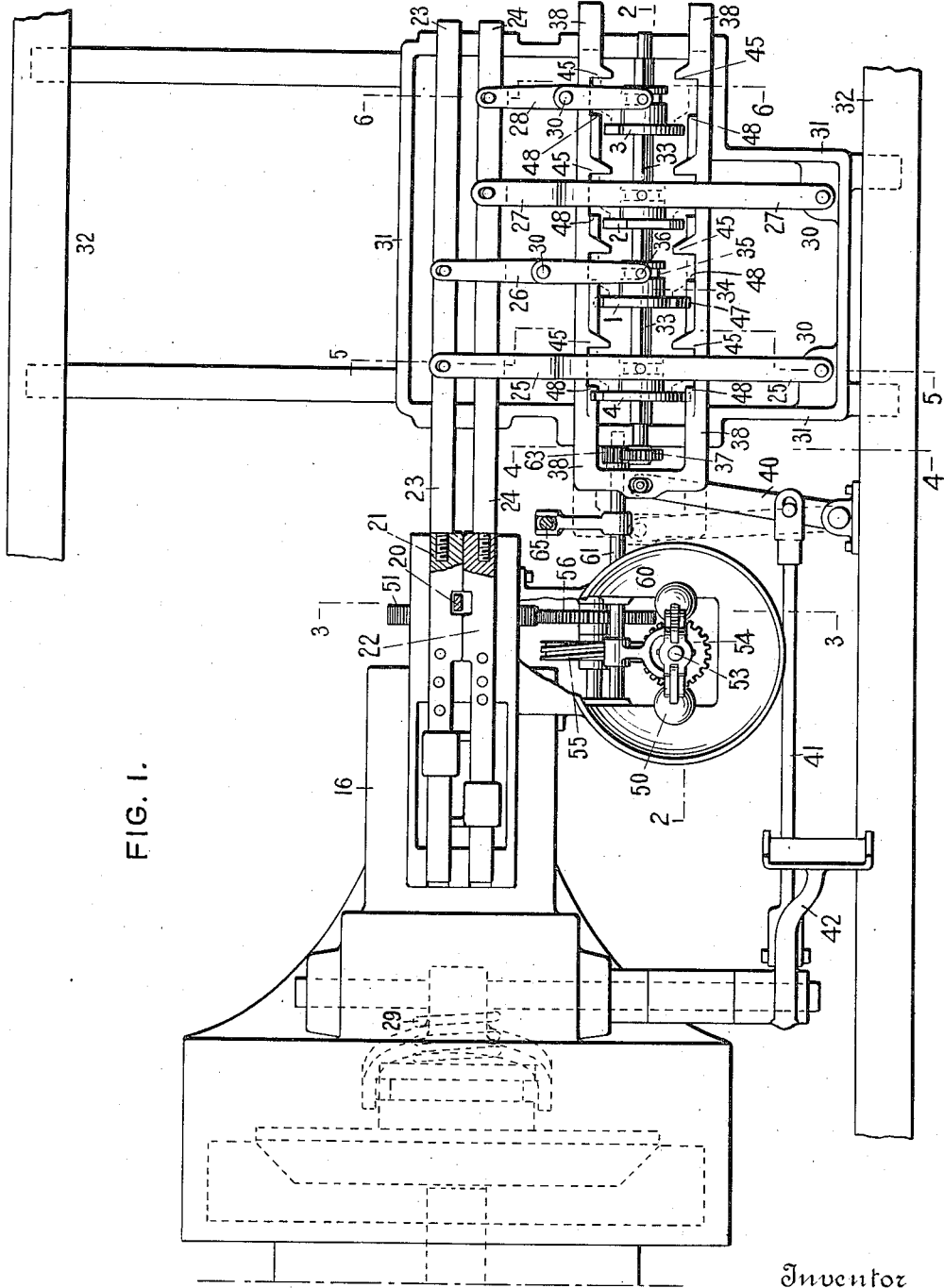
F. DE W. GOODWIN.
GEAR SHIFTING MECHANISM.
APPLICATION FILED DEC. 18, 1916.
1,286,997.
Patented Dec. 10, 1918.
3 SHEETS—SHEET 1.
FIG. I.
Inventor
Frederick DeWitt Goodwin

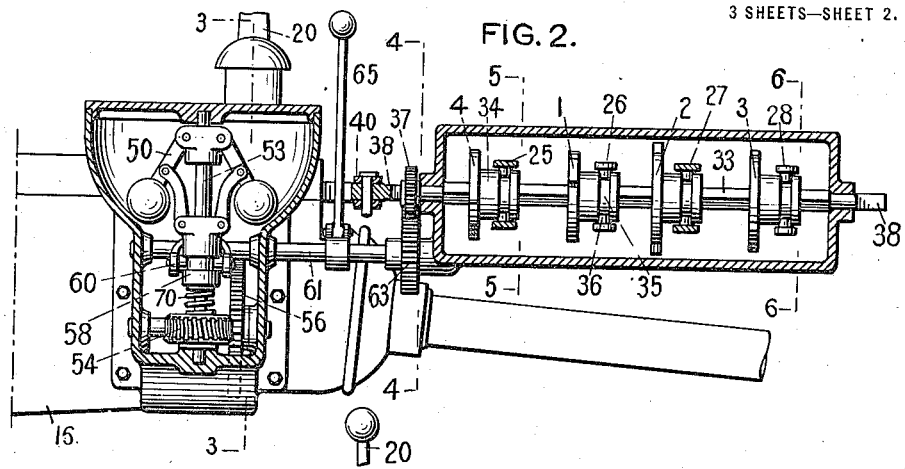
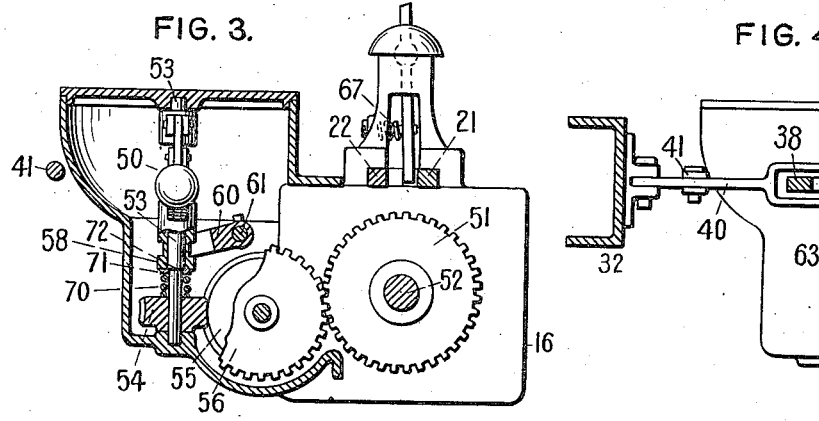
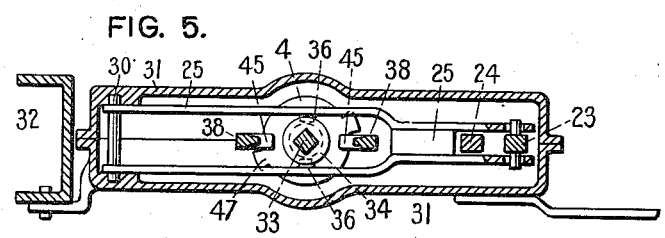
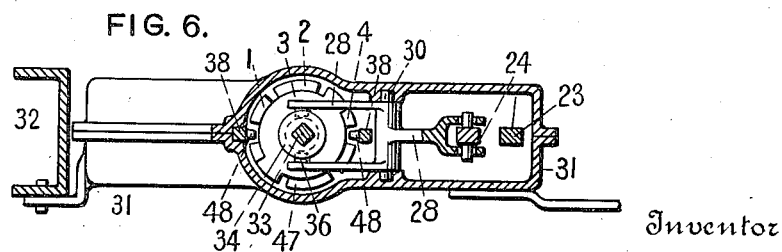

UNITED STATES PATENT OFFICE.

FREDERICK DE WITT GOODWIN, OF PHILADELPHIA, PENNSYLVANIA.

GEAR-SHIFTING MECHANISM.

1,286,997. Specification of Letters Patent. Patented Dec. 10, 1918.

Application filed December 18, 1916. Serial No. 137,494.

*To all whom it may concern:*

Be it known that I, FREDERICK DE WITT GOODWIN, a citizen of the United States, residing at Philadelphia, in the county of Philadelphia and State of Pennsylvania, have invented certain new and useful Improvements in Gear-Shifting Mechanism, of which the following is a specification.

My invention relates to mechanism for shifting the transmission gears of an automobile. The object of my invention is to dispense with the necessity of operating the hand gear shift lever when changes of speed are desired; a further object of my invention is to provide mechanism controlled by the operation of the clutch pedal for shifting the gears of the transmission into action and for returning the said gears into the neutral position, (or out of action), by operating the clutch pedal only.

In carrying out my invention I employ a shaft having disks slidably mounted thereon, which shaft and disks are oscillated by the movement of the traction wheels of the automobile through the action of a governor. In conjunction with said disks I employ a sliding member which is controlled by the clutch pedal; the forward movement of the clutch pedal disengages the clutch and causes the sliding member to engage the disks and move them into the neutral position and thereby shift the transmission gears into the neutral position. A return or rearward movement of the clutch pedal will cause the sliding member to move rearwardly and engage the projections upon a certain disk, which has been rotated by the governor so as to bring the projections upon the disk into alinement with the sliding member; the latter gives a sliding movement to the disk which movement is communicated to the sliding gear of the transmission and one particular gear of the transmission is brought into the operative position; and a still further object of my invention is to provide means for bringing the gear shifting mechanism into the operative position when the automobile is standing still.

Referring to the accompanying drawings in which like reference characters refer to like parts:—Figure 1, is a plan view of a portion of the clutch and transmission of an automobile, showing my improved gear shifting device attached thereto; Fig. 2, is a longitudinal vertical section on line 2—2 Fig. 1; Fig. 3, is a transverse vertical section on line 3—3 Figs. 1 and 2; Fig. 4, is a transverse vertical section on line 4—4 Figs. 1 and 2; Fig. 5, is a transverse vertical section on line 5—5, Figs. 1 and 2; Fig. 6, is a transverse vertical section on line 6—6 Figs. 1 and 2; Fig. 7, is a partial plan view of the sliding member and the gear shift bars, shown in Fig. 1, showing in full lines the sliding disks and levers in a position in which the low, or first speed, gears are in mesh, and showing in dotted lines the position which the parts assume when the reverse gears are in mesh; Fig. 8, is a view similar to Fig. 7, showing in dotted lines the position of the parts when they have moved the second or intermediate gears into mesh and showing in full lines the parts when they have moved the third or high speed gears or clutch members into mesh; Fig. 9 is a transverse vertical section on line 9—9 Fig. 7, showing the first speed disk engaged by the sliding member; Fig. 10, is a vertical section on line 10—10 Fig. 8, showing the second speed disk engaged by the sliding member, which is the position shown in dotted lines in Fig. 8; Fig. 11, is a vertical section on line 11—11 Fig 8, showing the third speed disk in engagement with the sliding member; Fig. 12, is a vertical section on line 12—12 Fig. 8, showing the reverse gear disk engaged by the sliding member; Fig. 13, is a plan view, (showing the casing in section), of a different construction of my improved gear shifting device, designed so as to be contained within the transmission casing; Fig. 14, is a vertical section on line 14—14 Fig. 13; and Fig. 15, is a transverse vertical section on line 15—15 Fig. 14.

Referring to the drawings in which like reference characters refer to like parts 16, represents the casing containing the ordinary sliding gear transmission of an automobile. The speed changing members 17 and 18 of the transmission being shown in Fig. 14. The handle 20 Figs. 1, 2 and 3 is for shifting the sliding bars 21 and 22, which in turn engage the sliding gears 17 and 18 of the transmission.

The sliding bars 21 and 22 are attached to the sliding bars 23 and 24 of my improved gear shifting device, as shown in Fig. 1. Pivotally connected with the bars 23 and 24 are levers 25—26—27 and 28 fulcrumed, on the pivot pins 30, in the casing 31 supported between side frame members 32 of the chassis.

The levers 25—28 are operated by movable members on disks 1, 2, 3 and 4 slidably mounted upon a square shaft 33, which is rotatably mounted in the casing 31.

The disks 1—4, have cylindrical hubs 34 with annular grooves formed therein into which the pins or rollers 36, of the levers 25—28 enter and engage the hubs of the disks, so that the levers and disks will move together.

The disks 1—4, are moved longitudinally upon the square shaft 33, by a sliding member 38, which is loosely mounted in the casing 31, and adapted to embrace the disks. The sliding member 38 is connected by a lever 40 and a connecting rod 41 with the usual clutch pedal 42 of the automobile.

The sliding member 38, is preferably made in the form of a yoke so that diametrically opposite points of the disks are engaged by the oppositely disposed projections upon the yoke simultaneously, which insures the disks sliding easily upon the shaft 33.

The disks 1—4 have a circular body portion as shown in Fig. 5, which is of sufficient diameter to be engaged by the projections 45, upon the sliding member 38. The projections 45 are located in the rear of each disk, so that a full forward movement of the clutch pedal 42 and of the sliding member 38, (as shown in dotted lines, Fig. 1.), will move all the disks into the neutral position, as shown in Fig. 1.

The sliding member 38, upon its rearward movement, engages the different disks and throws the different gears of the transmission into engagement, in the following manner:—

The disks 1—4 have lugs or projections 47 formed upon the peripheries, which are engaged by the projections or shoulders 48, formed on the sliding member 38, as shown in Figs. 1, 9, 10, 11 and 12, when the sliding member 38 is moved rearwardly, (into the position shown in Fig. 1.), by the action of the spring 29, which spring moves the clutch into engagement.

The disks 1—4 are oscillated, less than one half revolution by the movements of the automobile; a governor 50 is employed to oscillate the shaft 33, carrying the disks. The governor is driven by the gear wheel 51, on the shaft 52 which is connected with the traction wheels of the automobile. The same gear wheel may be used which is now employed to operate the speedometer.

The governor 50 is mounted upon a vertical shaft 53, which is rotated by gear wheels 54, 55, and 56, from the gear wheel 51 on the shaft 52. Upon the vertical shaft 53 is loosely mounted a collar 58, which moves upwardly as the governor is rotated and returns to its normal position, as shown in Figs. 2 and 3, when the automobile is at a standstill.

The collar 58 on the governor is arranged to oscillate the shaft 33, carrying the disks, through the arm 60, on the shaft 61, as shown in Figs. 1 to 4. A gear wheel 63, on the shaft 61, meshes with a gear wheel 37 on the shaft 33, carrying the disks, so that any vertical movement of the collar 58 of the governor will oscillate the shaft 33, carrying the disks.

When the automobile is at a standstill the governor will return the oscillating shaft 33 to the neutral position, as shown in Fig. 6, in which position there is sufficient space between the projections on the different disks to allow the sliding member 38 to move rearwardly without engaging any of the projections on the disks.

When the car is standing still the low or first gear of the transmission may be engaged by moving the clutch pedal 42 to the full forward position and by pressing down upon the handle 65, (shown in Figs. 1–4), which motion of the handle 65 will rotate the shaft 61, which will rotate the shaft 33 and rotate the disk in the direction of the arrow Fig. 9, in which position the projections 47 on the disk 1 will be in the path of the shoulders 48 of the sliding member 38: the clutch pedal is now allowed to move rearwardly and the first half of the rearward stroke of the clutch pedal causes the sliding member 38 to slide the disk 1 along the shaft 33, which moves the lever 26 into the position shown in full lines Fig. 7, and the bar 23 is moved forward, which will cause the low or first speed gears of the transmission to be brought into mesh. A further rearward movement of the clutch pedal will engage the clutch and the car will be put in motion and the governor 50 will be rotated. As the speed of the car increases the governor will further rotate the shaft 33, and by pushing the clutch pedal forward the clutch will be first disengaged and then the further forward movement of the clutch pedal will cause the sliding member 38 to move the disk 1 into the neutral position (see Fig. 1) by the projection 45 on the sliding member 38 engaging the body of the disk 1. The governor will now have rotated the disk 2 into the position shown in Fig. 10 and the sliding member 38, upon its return movement, will engage the projections on disk 2 and move the disk and the lever 27 into the position shown in dotted lines Fig. 8; in which position the lever 27 will have moved the gear shaft bar 24 into the position in which the second or intermediate gears of the transmission are in mesh.

As the speed of the car further increases the clutch pedal is again pushed forward, first to release the clutch and then move the disk 2 back into neutral position by the action of the sliding member, and said disk 2, through the lever 27, disengages the gears of the transmission. The governor will rotate the disk 3 into the position shown in Fig. 11. by the increased speed of the car, and when the clutch pedal is allowed to return to the rearward position, the sliding member 38 will engage disk 3, and through lever 28, the gear shift bar 24 will move the third or high speed mechanism of the transmission into engagement.

When the speed of the car diminishes the transmission gears may be changed from high speed to second speed by moving the clutch pedal forward the full stroke, which will move the gears into the neutral position and by allowing the clutch pedal to return to the rearward position, the disk 2 will be engaged by the sliding member 38 and moved to shift the gears into second speed, or if the speed of the car has been reduced sufficiently for the low speed gears, the diminishing speed of the governor will have rotated the shaft carrying the disks into a position in which the disk 1 will be engaged by the sliding member 38 and the low gears of the transmission will be shifted into engagement.

The car may come to a standstill when the low gears are still in mesh by holding the clutch pedal only part way forward which will release the clutch but will not move the disks into the neutral position. It will be seen that the car can thus be started from a standstill without using the hand lever. It is only necessary to use the hand lever for starting when the car is at a standstill and the gears have been shifted into the neutral position by a full forward movement of the clutch pedal.

The present form of hand lever 20 for shifting the gears may be retained for moving the gears from the neutral position into first speed or from the neutral position into reverse gear.

When the hand lever 20 is used, it is not necessary to have any projections on the reverse gear disk 4, in which instance the disk 4 is only used for moving the reverse gears out of action and into the neutral position by the forward movement of the clutch pedal. The projections 45 on the sliding member 38 engage the disk 4, and move disk 4 and the reverse gears into the neutral position.

The hand lever 20, as shown in Fig. 3. may be provided with one spring 67, which holds the lower end of the lever 20 in the notch formed in the gear shift bar 21, which bar controls the low gear and reverse gear. The other gear shift bar 22, which controls the second speed and high speed is operated automatically by the gear shifting device.

When the hand lever 65 is used for engaging the low gear, when the car is at a standstill, it is not necessary to use the lever 20. The reverse gear is brought into action by lifting the handle 65, which moves the oscillating shaft 33 in the opposite direction from the movement imparted to the said shaft by the governor.

A spring 70, (see Figs. 2 and 3), is provided on the governor shaft 53, which tends to hold the washer 71 against the shoulder 72 formed on the shaft 53. This limits the upward movement of the spring 70. The collar 58 of the governor rests upon the washer when the governor is not rotating and the shaft 33 carrying the disks is in the neutral position. When it is desired to use the reverse gears the hand lever 65 is lifted and the spring 70 is contracted and the shaft 61 rotates the shaft 33, in the direction of the arrow Fig. 12. This moves the disk 4 from the neutral position, which is indicated by the horizontal line, into the reverse position indicated by the dotted radial line. This brings the projections on reverse disk 4 into the path of the projections 48 on the sliding member 38 and the sliding member 38 will move the disk 4 and the lever 25 into the position shown in dotted lines Fig. 7. and move the gear shift bars 23 and 21 in the proper direction to engage the reverse gears of the transmission.

The projections 47 upon the different disks are so arranged that the projections 48 on the sliding member 38 cannot engage two disks simultaneously. A space is allowed in the longitudinal alinement of the projections on the different disks, which space is equal to the cross section of the projections 48 on the sliding member 38, as shown in Fig. 6. This arrangement of the projections 47 on the disks, makes it impossible for the projections 48 on the sliding member 38 to engage two different disks simultaneously. In case the sliding member should pass through the space allowed between the projections on the disks it will only be necessary to move the sliding member 38 forward to allow the action of the governor to give a slight rotary motion to the disks, in either direction, and the sliding member will then engage one of the disks upon its return movement.

The gear shifting device illustrated in Figs. 1 to 12 is designed as an attachment to be put on automobiles which are in use; Figs. 13-14 and 15, illustrate the gear shifting device designed as part of transmission of the automobile. The gear shifting bars 21—24 are dispensed with. The oscillating shaft 75, is similar to the shaft 33. Said shaft carries the disks 76, 77, 78 and 79, which control the first, second, third and the reverse gears respectively.

The shaft 75 carrying the disks is mounted in the casing 80. Each disk operates an arm 81, secured upon vertical shafts, 82, 83, 84 and 85 which shafts are connected in pairs by the segmental gears 86, secured on said vertical shafts. The said vertical shafts 83 and 84, carry arms 88 and 89, which engage the sliding gears 17 and 18 of the transmission.

The sliding member 90 for moving the disks along the shaft 75, is operated by an arm 91, secured on the shaft 92 to which is secured the clutch pedal. The arm 91 is shown in the forward position as if the clutch pedal were pushed forward to release the clutch. This forward movement of the sliding member 90 has moved all the disks into the neutral position. The rearward movement of the sliding member engages the disk on the shaft 75 which has been rotated by the governor to bring the projections on said disk into the path of the projections on the sliding member 90.

The governor which may be the same as above described is operated by the traction wheels. The governor oscillates the shaft 93 which oscillates the shaft 75 carrying the disks.

A hand lever 95 is secured upon the shaft 93 for rotating said shaft sufficiently to bring the projections on disk 76 into engagement with the sliding member 90 so that the latter may shift the low gear into the operative position. The reverse gear disk 79 may be brought into operative engagement with the sliding member 90 by moving the hand lever 95 in the opposite direction, which will rotate the shaft 75 so that the reverse gear disk 79 will be moved by the sliding member and shift the reverse gears of the transmission into action.

Having thus described my invention I claim and desire to secure by Letters Patent:—

1. In an automobile, the combination of a movable member connected with a speed changing member of the transmission, means controlled by the speed of the automobile for positioning the said movable member, and a member operable by and at the will of the driver adapted to engage the said movable member and thereby shift the said speed changing member of the transmission.

2. In an automobile, the combination of a movable member actuated by the mechanism connected with the traction wheels, a member operable by and at the will of the driver adapted to engage the said movable member when the latter is in certain positions, and a connection between the said movable member and the transmission gearing for shifting the position of the said gearing when the movable member is moved by the said engaging member.

3. In an automobile, the combination of a movable member actuated by the mechanism connected with the traction wheels whereby said movable member is moved through a certain plane, a sliding member manually operated and sliding in a plane at right angles with the plane of movement of the movable member, said sliding member adapted to engage the movable member when the latter is in certain positions, and connecting elements between the movable member and the transmission gearing for shifting the position of said gearing when the movable member is actuated by the sliding member.

4. In an automobile, the combination of a movable member actuated by mechanism connected with the traction wheels for positioning the movable member, connecting elements between the movable member and the transmission gearing for shifting the latter, a shifting member adapted to engage the said movable member and move the latter into the neutral position when the shifting member is moved in one direction, and upon the sliding member being moved in the opposite direction to engage the movable member when the latter is in a certain position which is controlled by the speed of the automobile.

5. In an automobile, the combination of a series of movable members each adapted to shift a speed change member of the transmission, a shifting member adapted to engage the movable members and return said movable members to the neutral position, upon the shifting member being moved in one direction, and means controlled by the speed of the car for successively moving the said movable members into the path of the shifting member whereby the latter when moved in the opposite direction will engage one of said movable members and shift one of the speed changing members into the operative position.

6. In an automobile, the combination of a governor operated by mechanism connected with the traction wheels, a movable member actuated by the governor, a shifting member adapted to engage the said movable member, and connecting elements between the movable member and a speed changing member of the transmission whereby the speed changing member may be shifted by the operation of the shifting member.

7. In an automobile, the combination of a governor operated by mechanism connected with the traction wheels, movable members actuated by the governor, a shifting member adapted to engage the said movable members, connecting elements between the movable members and the speed changing members of the transmission whereby the speed changing members may be shifted by the operation of the shifting member and means for bringing the parts into the operative position when the governor is at rest.

8. In an automobile, the combination of an oscillating shaft, a movable member slidably mounted upon and adapted to turn with said shaft, connecting elements between the movable member and a speed changing member of the transmission, and a shifting member adapted to engage the said movable member and shift the said speed changing member.

9. In an automobile, the combination of an oscillating shaft, a disk slidably mounted upon the said shaft, connecting elements between the disk and a speed changing member of the transmission, a sliding member, and a projection on the latter for engaging said disk.

10. In an automobile, the combination of an oscillating shaft, a disk slidably mounted upon said shaft, connecting elements between the disk and the speed changing members of the transmission, a sliding member, and projections upon the sliding member for engaging the disk between the said projections and sliding the disk in either direction.

11. In an automobile, the combination of an oscillating shaft, a disk slidably mounted upon said shaft, a projection on the periphery of the disk, connecting elements between the disk and a speed changing member of the transmission, a sliding member, a projection on the sliding member adapted to engage the projection on the disk and move the disk in one direction and a projection upon the sliding member adapted to engage the body portion of the disk and move the latter in the opposite direction.

12. In an automobile, the combination of an oscillating shaft, disks slidably mounted upon said shaft, projections upon said disks, connecting elements between the disks and the speed changing members of the transmission, and a shifting member adapted to engage the projection on one of the disks and slide the disk along the shaft.

13. In an automobile, the combination of an oscillating shaft, disks slidably mounted upon said shaft, a projection on each disk, a sliding member mounted in a line parallel with the oscillating shaft, projections upon the sliding member for engaging the projections on the disks, the projections of the disks so positioned upon the disks that the sliding member may reciprocate without engaging any of the disks when the latter are in the neutral position and means for rotating the shaft carrying the disks so that a projection on one of the disks may be moved into the path of the projection upon the sliding member.

14. In an automobile, the combination of an oscillating shaft, disks slidably mounted upon said shaft, projections upon said disks, a sliding member mounted in a line parallel with the oscillating shaft, projections upon the sliding member for engaging the projections on the disks, said projections upon the several disks so positioned that in the parallel longitudinal alinement of the projections of the several disks said projections are separated the width of the cross section of the sliding member so that the latter cannot engage two projections on different disks simultaneously when the disks are rotated by the oscillating shaft.

15. In an automobile, the combination of an oscillating shaft, two disks slidably mounted upon said shaft, members connecting each disk with a single speed changing member of the transmission, whereby the latter may be moved in different directions by the movement of the disks in the same direction and means for engaging either of said disks.

16. In an automobile, the combination of an oscillating shaft, two disks slidably mounted upon said shaft, pivoted arms engaging each of the disks, a speed changing member of the transmission, means for connecting one of the pivoted arms directly with the speed changing member, means for connecting the other one of said pivoted arms indirectly with the said speed changing member and means for engaging the disks.

17. In an automobile, the combination of an oscillating shaft, disks slidably mounted upon said shaft, a sliding member consisting of a yoke embracing the disks, oppositely disposed projections upon the said yoke for simultaneously engaging the disks and connecting members between the disks and the speed changing members of the transmission.

18. In an automobile, the combination of an oscillating shaft, disks slidably mounted upon said shaft, diametrically disposed projections upon said disks, a sliding member consisting of two parallel bars, projections oppositely disposed upon said bars for engaging the diametrically disposed projections upon the said disks, and connecting members between the disks and the speed changing members of the transmission.

19. In an automobile, the combination of an oscillating shaft, disks slidably mounted upon said shaft, a sliding member, projections upon the sliding member for engaging the disks, a clutch pedal, connections between the clutch pedal and the sliding member, arms pivotally mounted and connected with the disks, and connecting members between the arms and the speed changing members of the transmission.

20. In an automobile, the combination of an oscillating shaft, disks slidably mounted upon said shaft, projections upon said disks, a sliding member adapted to engage the disks and slide the same upon said shaft, connections between the disks and the gear shifting members of the transmission, means for rotating the oscillating shaft in either direction to bring different disks into engagement with the sliding member, a governor controlled by the speed of the automobile for oscillating the shaft carrying the disks and a connection between the clutch pedal and the sliding member for operating the same.

In testimony whereof I affix my signature in the presence of two witnesses.

FREDERICK DE WITT GOODWIN.

Witnesses:
MARTHA H. QUINN,
H. P. JORDAN.